United States Patent [19]
Bouthillier

[11] Patent Number: 5,516,349
[45] Date of Patent: May 14, 1996

[54] MODULAR DUST COLLECTOR

[75] Inventor: Mario Bouthillier, Laprairie, Canada

[73] Assignee: Pyradia, Inc., Quebec, Canada

[21] Appl. No.: 238,495

[22] Filed: May 5, 1994

[51] Int. Cl.⁶ .................................................. B01D 46/00
[52] U.S. Cl. .............................. 55/276; 55/358; 55/366; 55/374; 55/379; 55/472; 55/473; 55/484
[58] Field of Search ............................. 55/276, 358, 366, 55/374, 379, 429, 472, 473, 484

[56] References Cited

U.S. PATENT DOCUMENTS

| 711,188 | 10/1902 | Stone | 55/484 |
|---|---|---|---|
| 2,223,353 | 12/1940 | Demaree | 55/276 |
| 2,338,504 | 1/1944 | Foster | 55/374 |
| 3,553,941 | 1/1971 | Wittemeier et al. | 55/484 |
| 3,690,045 | 9/1972 | Neumann | 55/358 |
| 3,871,848 | 3/1975 | Smith | 55/484 |
| 3,877,900 | 4/1975 | Mitchell | 55/374 |
| 4,560,395 | 12/1985 | Davis | 55/276 |
| 4,900,342 | 2/1990 | Spengler | 55/276 |
| 5,069,691 | 12/1991 | Travis et al. | 55/484 |
| 5,226,938 | 7/1993 | Bailey et al. | 55/366 |

FOREIGN PATENT DOCUMENTS

339841  11/1905  France ....................... 55/484

Primary Examiner—C. Scott Bushey
Attorney, Agent, or Firm—Michael D. Bednarek; Marks & Murase

[57] ABSTRACT

Disclosed is a dust collector that is essentially modular in structure, thereby making it easy to transport, position and assemble by the user himself or herself. This dust collector includes one or more filter modules, a fan module operatively connectable to one end of the filter module(s), an end plate for closing the opposite end of the filter module(s), and optionally a silencer module intercalatable between the fan module and the filter module(s) to reduce the noise of the fan. In use, the dust collector can be easily upgraded whenever required by merely changing the motor, fan wheel and inlet of the fan module and/or adding one or more filter module in order to increase the filtering surface area.

12 Claims, 6 Drawing Sheets

MODULAR DUST COLLECTOR

BACKGROUND OF THE INVENTION a) Field of the Invention

The present invention relates to a modular dust collector. More particularly, it relates to a dust collector which is made of a plurality of modules that are easy to transport, position and assemble onto the premises to fit any user's requirement and which can be easily upgraded whenever required, especially if one wants to increase the dust filtering and collecting capacity of the collector.

b) Brief Description of the Prior Art

In numerous industries where saw benches, sanders, planing machines and the like are used for working wood pieces, plastic sheets or other materials, it is of conventional practice to use fans in order to collect the substantial amount of dust and chips that can be generated. Indeed, the so-generated dust can be a health hazard for the workers in addition to being a source of pollution within the working premises.

So far, the dust collectors that are used on an industrial scale are essentially built in equipments including hoods, dust pipes, fans and the like, that must be installed by specialists and cannot be easily upgraded to meet the user's exact need.

OBJECTS AND SUMMARY OF THE INVENTION

An object of the present invention is to provide a dust collector that is essentially modular in structure, thereby making it easy to transport, position and assemble even by the user himself or herself.

Another object of the invention is to provide a modular dust collector including a plurality of modules which can be easily upgraded whenever required by merely changing the motor, fan wheel and inlet of the fan module and/or adding one or more filter modules in order to increase the filtering surface area.

In accordance with the invention, these two objects are achieved with a modular dust collector comprising, in combination, one or more filter modules, a fan module operatively connectable to one end of the filter module(s), an end plate for closing the opposite end of the filter module(s), and optionally a silencer module intercalatable between the fan module and the filter modules to reduce the noise of the fan in use.

Each filter module comprises a filter bag-support in the form of a hollow box having a first open end, a second open end opposite to the first one, and one or more openings transversal to the first and second ends. Of course, a filter bag is detachably fixable to each opening to collect the dust passing therethrough.

The end plate mentioned above is used for closing the second open end of the filter bag-support of the filter modules.

The fan module comprises a fan having an inlet connectable to a dust collecting pipe, and a peripheral outlet, a motor operatively connected to the fan for driving the same, a fan plate having an opening made therein, bracket means for mounting the fan and motor onto the fan plate with the outlet of the fan in registry with the opening of the fan plate; and fixation means for detachably fixing the fan plate to the first open end of the filter bag-support of the filter module so as to close the same.

The optional silencer module is in the form of another hollow box intercalatable between the first open end of the filter bag-support of the filter module and the fan plate. This other hollow box has, for this purpose, a first open end to which the fan plate is detachably fixable at a plurality of different angular positions, a second open end detachably fixable to the first open end of the filter bag-support, and an internal lining made of a sound absorbing material as to reduce the noise of the fan.

Each module is preferably made of steel and sized to be easy to transport as individual package including all the necessary hardware for interassembly. Thus, for example, each module could be sized not to exceed 8 cubic feet in volume (24"×24"×24").

When assembled and operatively connected to a dust collecting pipe and a power source, the modules altogether form a very simple yet efficient structure wherein the dust sucked in by the fan through the duct collecting pipe and blown into the filter module(s) is collected into the filter bag(s) of the filter module(s).

As can be appreciated, the dust collector according to the invention can be installed by the user himself within his premises, by assembling the numbers of modules he needs for his particular requirement. This dust collector can subsequently be upgraded whenever desired, by changing the motor, fan wheel and inlet of the fan module to switch from, for example, 3 to 15 H.P., or by adding other filter modules if such are required.

Preferably, the fixation means of the fan module are devised to allow fixation of the fan plate at a plurality of different angular positions relative to the openings in the filter bag-supports. With such an arrangement, one may select any one of the different angular positions to adjust the position of the inlet of the fan with respect to the dust collecting pipe so as to facilitate their connection. In other words, the location of the inlet of the fan can be on top, at the bottom, or in the left or right side of collector, thereby facilitating connection and assembly of the duct collecting pipe.

The invention and its advantages will be better understood upon reading of the following non-restrictive description of a preferred embodiment thereof, made with reference to the accompanying drawings.

DESCRIPTION OF A PREFERRED EMBODIMENT OF THE INVENTION

The modular dust collector 1 according to the invention as shown in the drawings comprises, in combination;
- one or more filter modules 3, 3', 3", 3'". . . , that are identical in shape;
- a fan module 5 operatively connectable to one end of the filter module(s);
- an end plate 7 (see FIG. 3) for closing the opposite end of the filter module(s); and
- an optional silencer module 9 intercalatable between the fan module 5 and the filter module(s) to reduce the noise of the fan in use.

Each filter module like the one numbered 3, comprises a filter bag-support 11 in the form of a hollow box that is preferably made of metal such as steel, aluminium or other, and cubic in shape. This bag support 11 has a first open end 13, a second open end 15 opposite to the first one and preferably two openings 17, 19 transverse to the first and second ends (see FIG. 3) eventhough it could have only one or more than two such openings. A filter bag 21 is detachably fixable to each opening to collect the dust passing therethrough. For this purpose, each bag-support 11 comprises an outwardly projecting flange 23, 25 extending all around each of its openings 17, 19. Each filter bag 21 preferably has an inlet of substantially the same size as the corresponding opening in the box. A collar 27, 29 is used for detachably fixing the inlet of each filter bag 21 to the flange 23, 25 of the corresponding opening 17, 19 of the bag-support 11.

Figure 1:
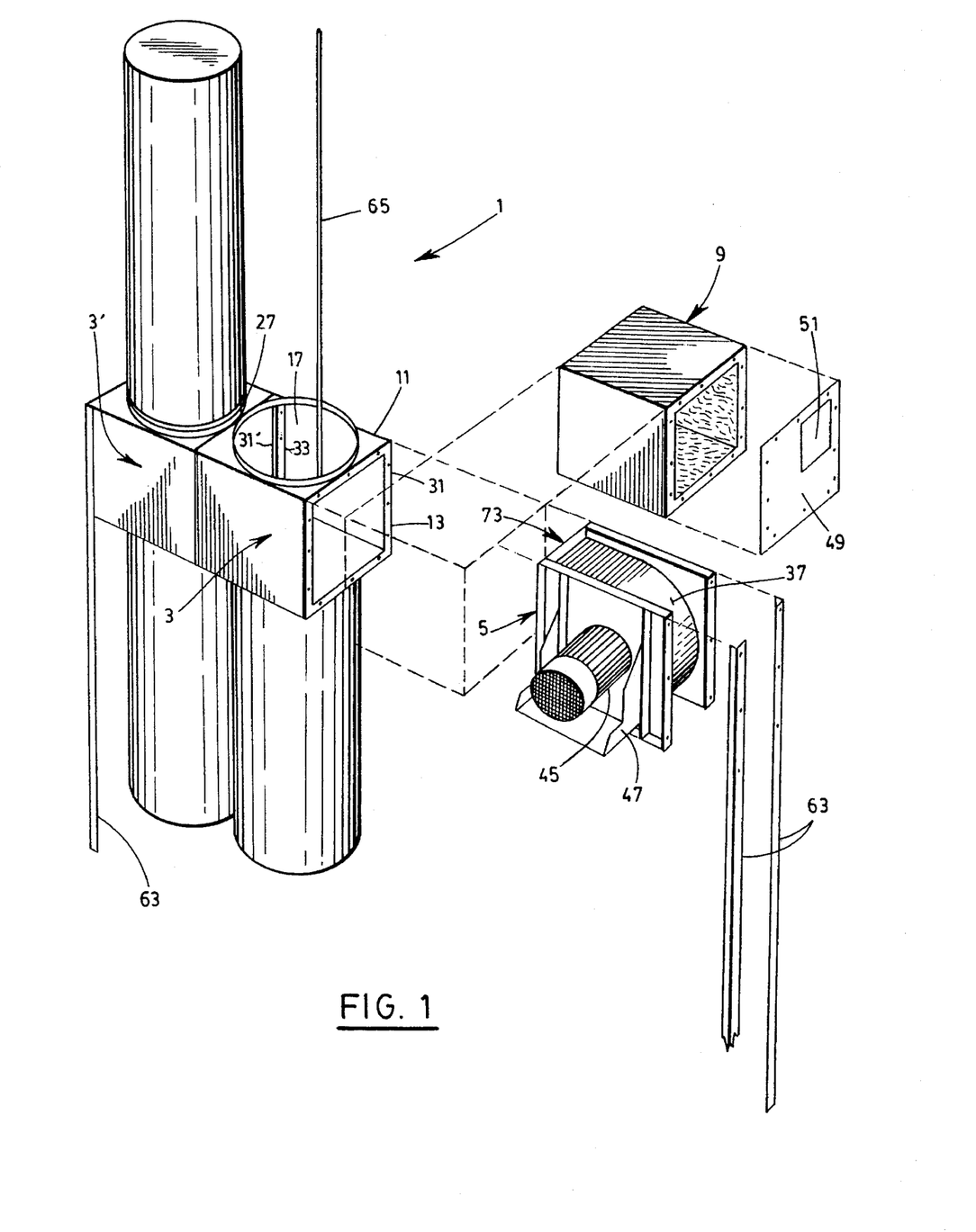
FIG. 1 is a semi-exploded perspective view of a modular dust collector according to the invention, showing the silencer module, the fan module and two legs in detached position.
Figure 2:
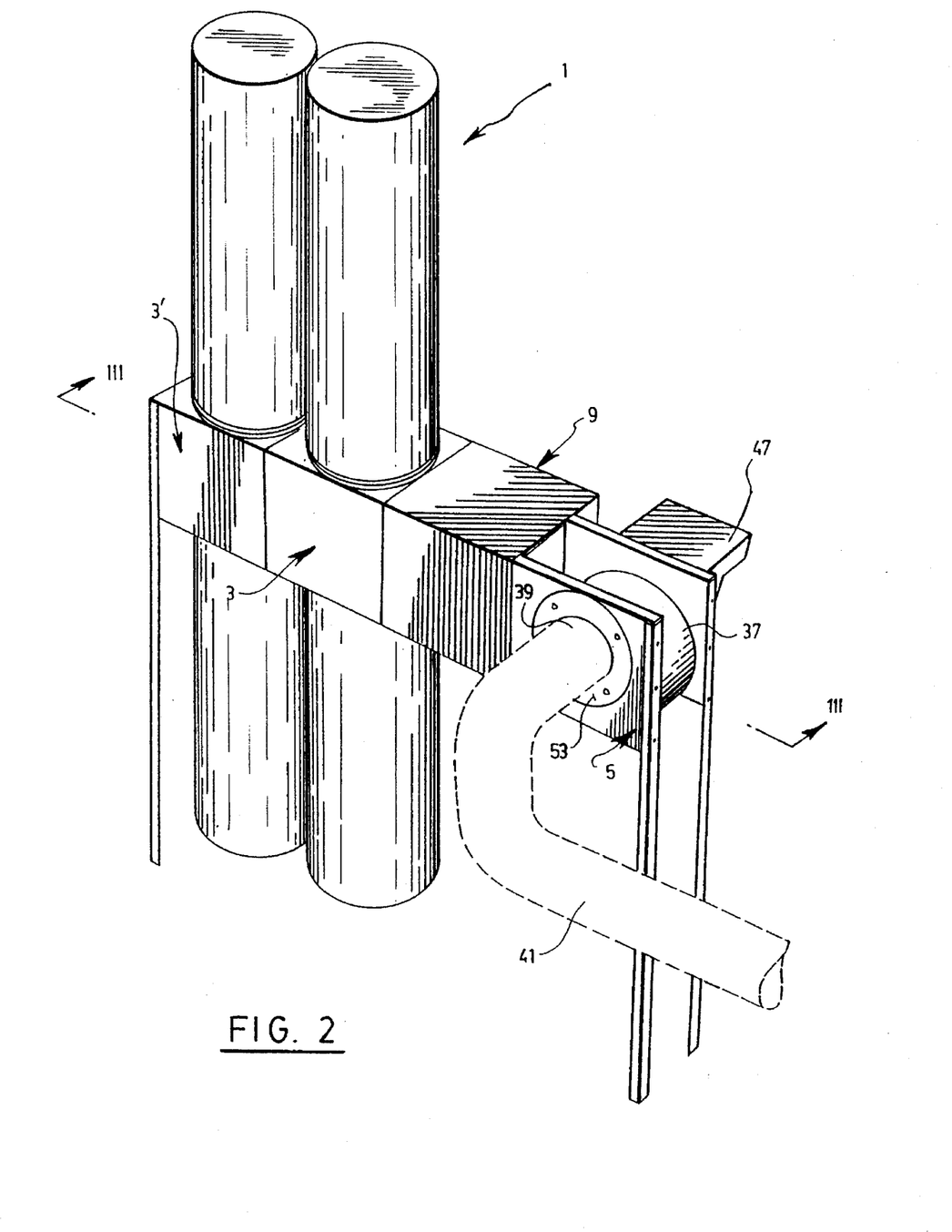
FIG. 2 is a perspective view similar to FIG. 1, showing all the modules of the dust collector attached to each other, except for the fan module which is shown attached in inverted position as compared to FIG. 1.
Figure 3:
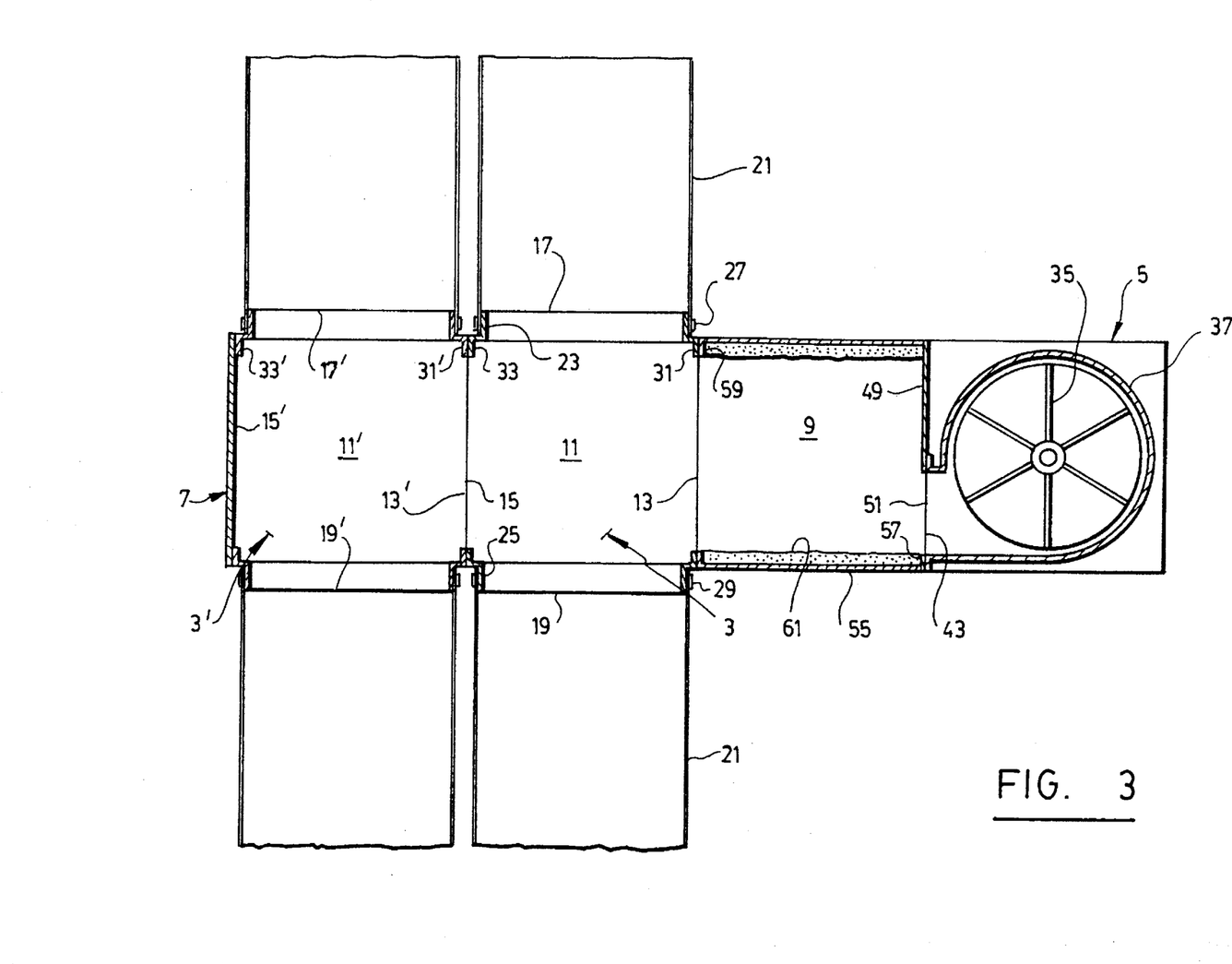
FIG. 3 is a cross-sectional view taken along line III—III of FIG. 2, except for the fan module which is shown attached in a different angular position.
Figure 4:
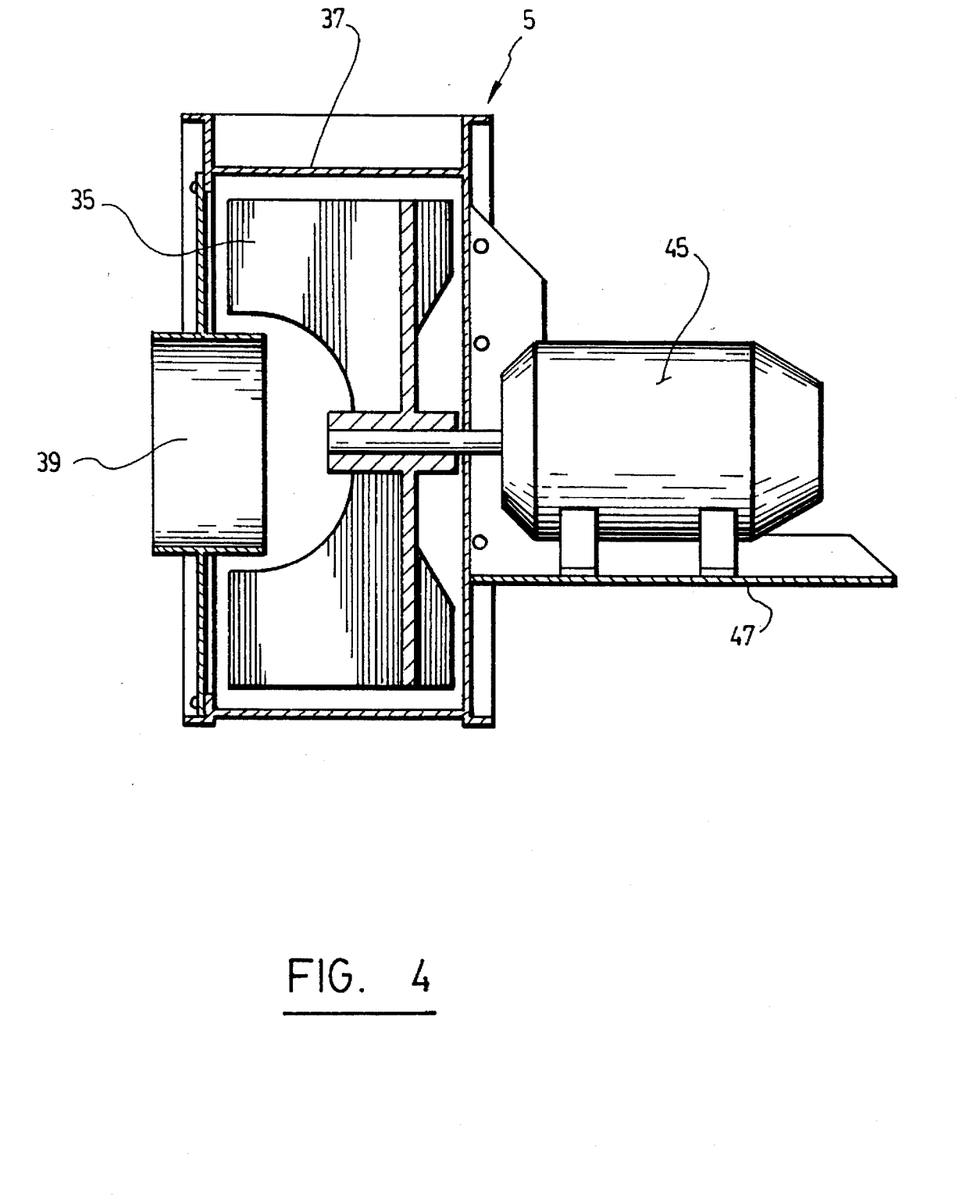
FIG. 4 is a cross-section view of the fan module used in the dust collector according to the invention.

As is shown, the hollow box of each filter module 3 includes peripheral fixation flanges 31, 33 surrounding each of its first and second open ends 13, 15. These fixation flanges which extend in the planes of the first and second open ends, are provided with trough-holes positioned to be in registry when two filters module are intended to be connected to each other, and sized to receive fixation bolts and nuts (not shown). Thus, when use is made of two filters module 3 and 3' as shown in FIGS. 1 to 3, the second filter module 3' which is identical to the first one 3 can be intercaled between the first filter module 3 and the end plate 7 and the first open end 13' of the second filter module 3' can be detachably fixed to the second open end 15 of the first filter module 3 via their flanges 33, 31' while the second open end 33' of the second filter module 3' is closed by the end plate 7. Of course, further filter modules 3", 3'" could similarly be fixed so that all the modules extend in line and are in open communication as shown, for example, in FIGS. 6b and 6c.

As already explained, the end plate is used for closing the second open end 15' of the filter bag-support of second (or last if more than two) filter modules 3' (or 3", 3'", . . . ), by connection thereto with bolts and nuts or with screws to the flange 33'.

As is also shown, the fan module 5 comprises a fan unit including a fan wheel 35 rotatably mounted within a casing 37 having an inlet 39 connectable to a dust collecting pipe 41 and a peripheral outlet 43. The fan module 5 also comprises a motor 45 rigidly mounted onto a supporting flange 47 and directly connected to the fan wheel 35 for rotating the same, and a fan plate 49 having an opening 51 made therein. Bracket means 73 are provided for mounting the fan and motor 45 onto the fan plate 49 with the outlet 43 of the fan casing 37 in registry with the opening 51 of the fan plate 49 as shown in FIG. 3. Fixation means are provided for detachably fixing the fan plate 51 to the first open end of the filter bag-support of the first filter module so as to close the same. These fixation means include the peripheral flange 31 surrounding the first open end 13 of the first filter bag-support 3. This peripheral flange 31 which extends in the plane of the first open end 13 allows fixation thereto of the fan plate with screws or bolts and nuts.

Advantageously, the first open end 13 and its surrounding flanges 31 are square, as is the fixation plate 49. This advantageously allows fixation of the fan plate 49 in any of four different angular positions relative to the opening 13 in the first filter bag-support. With such an arrangement, one may select any one of the four angular positions of the fan plane 49 and thus adjust the position of the inlet 39 of the fan connected thereto by the bracket means 73 with respect to the dust collecting pipe 41 so as to facilitate their connection. In other words, the location of the inlet of the fan can be on top, at the bottom, or in the left or right side of the collector 39, as shown in FIGS. 2 and 6a to c, thereby facilitating connection and assembly of the dust collecting pipe 41.

Figure 5:
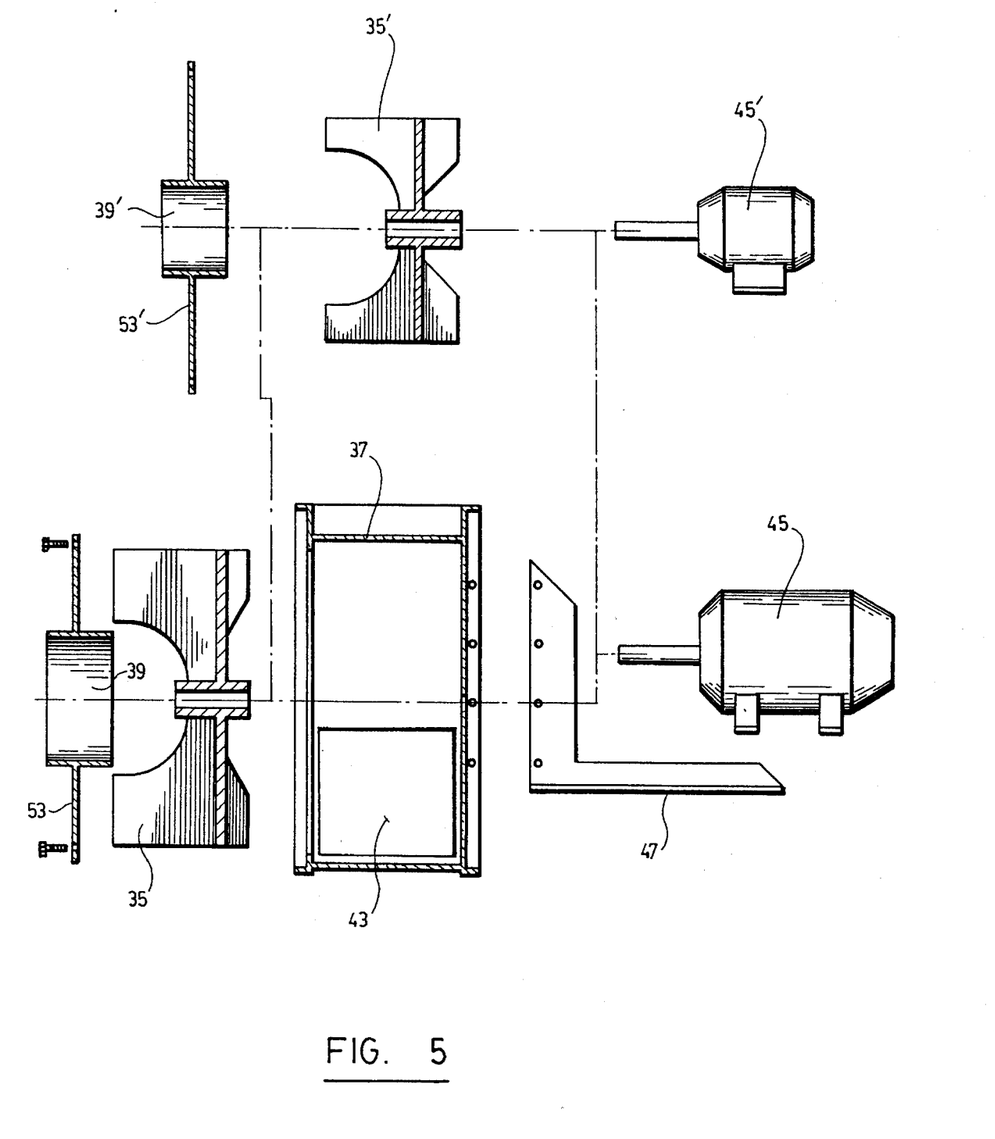
FIG. 5 is an exploded cross-sectional view similar to the one of FIG. 4, showing two examples of each of the interchangeable components of the fan module.

As is better shown in FIG. 5, the fan wheel 35 of the fan module 5 is preferably interchangeable and can be replaced by another fan wheel 35' of smaller or larger diameter so as to upgrade or reduce the "sucking" power of the fan. For this purpose, an inlet plate 53 is mounted on the casing 37. Of course, to be efficient, such a replacement of the fan wheel must also be accompanied by a modification in the size of inlet 39 of the fan, which for the purpose of simplicity, is located in the inlet plate 53 that can easily be replaced by another inlet plate 53' provided with another inlet 39', and by a simultaneous replacement of the original motor 45 by another one 45'.

Figure 6A:
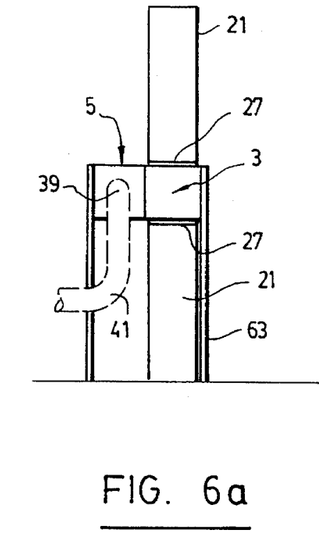
FIGS. 6a to 6c are front elevational view of different configurations of the modular dust collector according to the invention.

Referring back to Figures 1 and 3, the optional silencer module 9 is also in the form of another hollow box 55 preferably made of steel and cubic in shape. This module can be intercalated between the first open end 13 of the filter bag-support of the first filter module 3 and the fan plate 49. For this purpose, the hollow box 55 has a first open end edged by a fixation flange 57 to which the fan plate is detachably fixable at the plurality of different angular positions mentioned hereinabove, instead of being directly fixed to the flange 31 as shown in FIG. 6a. The hollow box 55 also has a second open end edged by a fixation flange 59 fixable to the flange 31 edging the first open end of the first filter bag-support 3. The hollow box 55 further has an internal lining 61 made of a sound absorbing material as to reduce the noise of the fan in use and thus to act as a "muffler".

Advantageously, holding means are provided to hold the filter modules 3, 3', . . . , the fan module 5 and the optional silencer module 9 at a given distance above the ground. Preferably, the holding means consists of legs 63 detachable fixable to some of the filter module(s), fan module and muffler module as is shown in the drawings. As is also shown, the filter modules are preferably positioned relative to the legs 63 and to the ground so that their opposite openings 17, 19 extend up and down, i.e. towards and opposite to the ground, respectively. In such a case, a filter-bag holder consisting of a vertical rod 65 is detachably attached to the hollow box of each filter module, so as to keep the filter bag 21 connected to the corresponding opening 17 opposite to the ground in a vertically extending position.

Figure 6B:
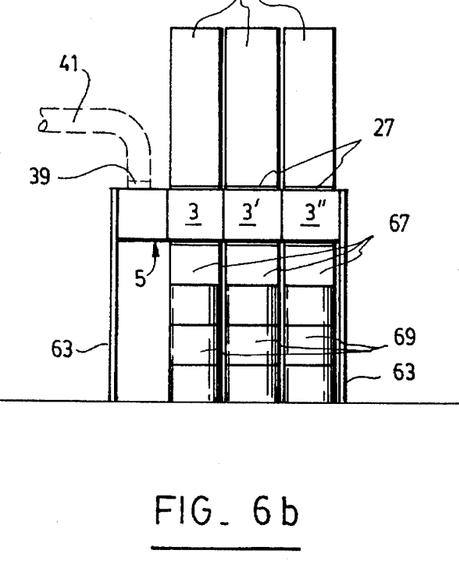

As is shown in FIG. 6b, each filter bag connected to the openings of the filter module facing the ground may also be in the form of an open-ended sleeve 67 having one end connected to the flange of the corresponding opening and another end detachably connectable to the rim of a dust-collecting drum 69.

As can now be appreciated, the dust collector according to the invention can be installed by the user himself or herself within his or her premises, by assembling the numbers of modules he or she needs for his or her particular requirement. This dust collector can subsequently be upgraded whenever desired, by changing the motor 45, the fan wheel 35 and the inlet 39 of the fan module 5 to switch from, for example 3 to 15 H.P. and, or by adding other filter modules 3', 3", 3'", . . . if such is required.

As explained hereinabove, the fixation means of the fan module are devised to allow fixation of the fan plate 49 at a plurality of different angular positions relative to the openings in the filter bag-supports.

Each module is preferably made of metal such as steel, aluminum or other, and sized to be easy to transport as an individual package including all the necessary hardware for interassembly. Thus, for example, each module could be sized not to exceed 8 cubic feet in volume (24"×24"×24"). The filter bags are preferably made of needle felt ⅛" thick and sized to offer a 55 gallon waste storage capacity per filter module.

When assembled and operatively connected to the dust collecting pipe 41 and to a power source (not shown), the modules altogether form a very simple yet efficient, sturdy and dependable structure wherein dust sucked in by the fan through the dust collecting pipe 41 and blow into the filter module(s) is collected into the filter bags 21 and/or into the drums 69 of the filter modules. As aforesaid, these bags and drums are secured by quick release clamps, thereby allowing speedy removal of the collected dust.

Figure 6C:
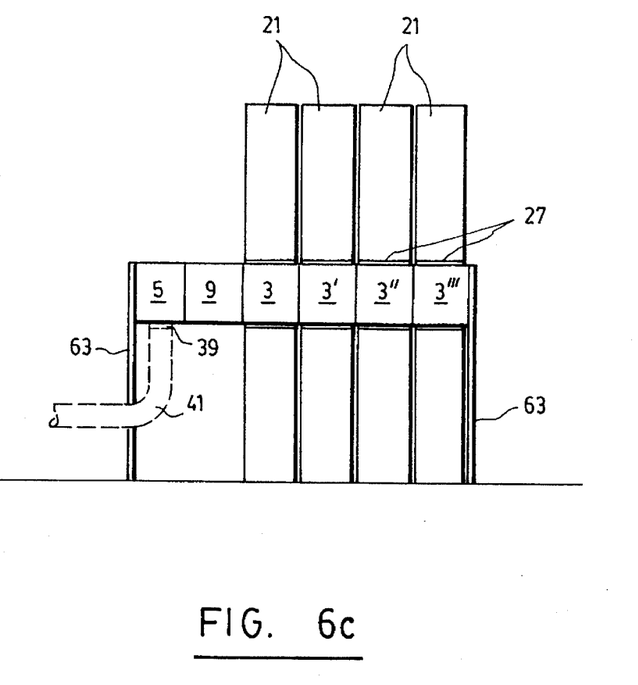

With a fan module of 3 or 5 H.P. and a fan module inlet diameter of 7 to 9", use can be made of 1 or 2 filter modules as shown in FIGS. 1 to 3 and 6a. With a fan module of 7.5 or 10 H.P. and an inlet diameter of 10 or 12", use can be made of 2 or 3 filter modules as shown in FIGS. 1 to 3 and 6b. With a fan module of 15 H.P. and an inlet diameter of 14", use can be made of 3 or 4 filter modules as shown in FIGS. 6b and 6c.

Tests carried out by the Applicant has shown that, in all cases, the use of a silencer module reduces by about one third the sound pressure level.

I claim:

1. A modular dust collector comprising, in combination:

at least one filter module, each filter module comprising:

a filter bag-support in the form of a hollow box having a first open end, a second open end opposite to the first one, and at least one opening transverse to said first and second ends; and a filter bag detachably fixable to each of said at least one opening; and an end plate for closing the second open end of the filter bag-support of the filter module; and a fan module comprising:

an interchangeable fan wheel rotatably mounted within a casing having an inlet connectable to a dust collecting pipe, said inlet being located in an interchangeable inlet plate mounted on said casing, and a peripheral outlet;

an interchangeable motor mounted on a supporting flange fixed to the casing, said motor being operatively connected to the fan wheel for driving the same;

a fan plate having an opening made therein;

bracket means for mounting said casing, fan wheel and motor onto said fan plate with the outlet of said casing in registry with the opening of said fan plate; and fixation means for detachably fixing the fan plate to the first open end of the filter bag-support of the filter module so as to close the same, said fixation means being devised to allow fixation of said fan plate at a plurality of different angular positions relative to said at least one opening in said filter bag-support, wherein the interchangeable fan wheel, said interchangeable inlet plate and said interchangeable motor are replaceable with another fan wheel of a different size, another inlet plate with an inlet of different size, and another motor of a different power, respectively to accommodate additional filter modules;

and whereby one may select only one of said angular positions to adjust the position of the inlet of the fan with respect to the dust collecting pipe so as to facilitate their connection; and then, one may operate the dust collector so that dust sucked in by said fan through said dust collecting pipe and blown into said filter module is collected into said at least one filter bag of said at least one filter module.

2. The modular dust collector of claim 1, wherein said fixation means includes a peripheral flange surrounding the first open end of the filter bag-support, said peripheral flange extending in a plane parallel to said first open end and allowing fixation thereto of said fan plate.

3. The modular dust connector of claim 1, further comprising:

a silencer module in the form of a further hollow box interchangeable between the first open end of the filter bag-support of the filter module and the fan plate, said further hollow box having, for this purpose, a first open end to which said fan plate is detachably fixable at a plurality of different angular positions, a second open end detachably fixable to the first open end of said filter bag-support, and an internal lining made of a sound absorbing material as to reduce the noise of the fan in use.

4. The modular dust collector of claim 3, wherein:

said filter bag-support has two openings that are opposite to each other;

said filter bag-support comprises an outwardly projecting flange extending all around each of said two openings, each filter bag having an inlet of substantially the same size as the corresponding opening in the box; and a collar is used for detachably fixing the inlet of each filter bag to the flange of the corresponding opening in the box.

5. The modular dust collector of claim 4, wherein:

holding means are provided to hold the filter module, the fan module and the silencer module at a given distance above the ground;

said filter module is positioned relative to said holding means and to the ground so that the opposite openings of the hollow box of said filter module extend towards and opposite to the ground, respectively; and a filter-bag holder is detachably attachable to said hollow box so as to keep the filter bag connected to the opening opposite to the ground in a vertically extending position.

6. The modular dust collector of claim 5, wherein:

said holding means consists of legs detachably fixable to said filter module, said fan module and said silencer module; and said filter bag holder consists of a vertical rod detachably attachable to the hollow box of the filter module.

7. The modular dust collector of claim 5, further comprising:

at least one other filter module identical to said filter module and interchangeable between said filter module and the end plate, each of said at least one other filter module having a first open end detachably fixable to the second open end of the filter module and a second open end to which either another filter module identical to the filter module and a second open end to which either another filter module identical to the filter module or said end plate is detachably fixable.

8. The modular dust collector of claim 7, wherein the hollow box of each of said filter modules includes peripheral fixation flanges surrounding said first and second open ends, said fixation flanges extending in planes parallel to said first and second open ends.

9. The modular dust collector of claim 8, wherein:

the hollow boxes of said silencer module and of each of said filter modules are made of steel and are cubic in shape; and each filter bag is made of needle felt.

10. The modular dust collector of claim 9, wherein:

each filter bag connected to the opening of a hollow box facing the ground is in the form of an open-ended sleeve having one end connected to the flange of the corresponding opening, and another end detachably connectable to the rim of a dust-collecting drum.

11. The modular dust collector of claim 1 further comprising:

at least one other filter module identical to said filter module and interchangeable between said filter module and the end plate, each of said at least one other filter module having a first open end detachably fixable to the second open end of the filter module and a second open end to which either another filter module identical to the filter module or said end plate is detachably fixable.

12. The modular dust collector of claim 11, wherein the hollow box of each of said filter modules includes peripheral fixation flanges surrounding said first and second open ends, said fixation flanges extending in planes parallel to said first and second open ends.

* * * * *